US007271740B2

(12) United States Patent
Fischer

(10) Patent No.: US 7,271,740 B2
(45) Date of Patent: Sep. 18, 2007

(54) SYSTEM AND PROCESS FOR PROVIDING IMPROVED AIRCRAFT OPERATIONAL SAFETY

(76) Inventor: Mark R. Fischer, 1730 Lower State Rd., Doylestown, PA (US) 18901-7033

( * ) Notice: Subject to any disclaimer, the term of this patent is extended or adjusted under 35 U.S.C. 154(b) by 99 days.

(21) Appl. No.: 11/018,749

(22) Filed: Dec. 20, 2004

(65) Prior Publication Data

US 2006/0022845 A1   Feb. 2, 2006

Related U.S. Application Data

(60) Provisional application No. 60/531,318, filed on Dec. 19, 2003.

(51) Int. Cl.
   *G08B 21/00*   (2006.01)
(52) U.S. Cl. .............. 340/945; 340/963; 244/189; 701/2; 701/14
(58) Field of Classification Search ............ 340/945, 340/959, 960, 961, 962, 963, 971; 701/14, 701/120, 121, 29, 2, 16; 342/29, 30; 244/118.5, 244/183, 189, 194
   See application file for complete search history.

(56) References Cited

U.S. PATENT DOCUMENTS

| 4,835,537 | A | * | 5/1989 | Manion ................... 342/30 |
| 5,493,309 | A | * | 2/1996 | Bjornholt ................. 342/455 |
| 5,890,079 | A | * | 3/1999 | Levine ..................... 701/14 |
| 5,904,724 | A | * | 5/1999 | Margolin .................. 701/120 |
| 5,974,349 | A | * | 10/1999 | Levine ..................... 701/29 |
| 6,133,867 | A | * | 10/2000 | Eberwine et al. .......... 342/29 |
| 7,099,752 | B1 | | 8/2006 | Lenell et al. |

* cited by examiner

*Primary Examiner*—Van T. Trieu
(74) *Attorney, Agent, or Firm*—Baker Botts LLP

(57) ABSTRACT

The present invention relates to a system and a process for providing improved operational safety for aircraft. The system/process of the instant invention utilizes real-time, two-way transmission of voice and/or text and flight-critical data between an aircraft and a ground-based computer workstation, where transmitted information monitored and acted upon as necessary by a qualified flight safety person, e.g., a appropriately trained individual (including but not limited to a safety pilot or other person trained in safety procedures). This safety person can perform a number of functions that would enhance flight safety, such as reducing the workload of the primary pilot(s), assisting in the performance of routine checklists, monitoring communications with air traffic control, and advising the pilot in the aircraft on how to handle any in-flight situations that may arise. By providing many if not all of the advantages of a second or third pilot in the aircraft cockpit without imposing additional weight or space requirements on the aircraft, the system/process of the instant invention can increase flight safety while reducing the associated costs.

55 Claims, 3 Drawing Sheets

SYSTEM AND PROCESS FOR PROVIDING IMPROVED AIRCRAFT OPERATIONAL SAFETY

PRIORITY AND RELATED APPLICATION

This application claims priority to U.S. Provisional Patent Application No. 60/531,318 filed on Dec. 19, 2003, entitled "A System and Process for Improved Aircraft Operational Safety," which is incorporated herein by reference in its entirety.

BACKGROUND OF THE INVENTION

FIELD OF THE INVENTION

The present invention relates to a system and a process for providing improved operational safety for aircraft. The system/process of the instant invention utilizes real-time, one- or preferably two-way transmission and communication of voice, text, and flight-critical data between an aircraft and a ground-based computer workstation, where it is monitored and acted upon as necessary by a appropriately trained individual (including but not limited to a appropriately trained individual (including but not limited to a safety pilot or other person trained in safety procedures) or other person trained in safety procedures). During certain phases of flight, the appropriately trained individual (including but not limited to a appropriately trained individual (including but not limited to a safety pilot or other person trained in safety procedures) or other person trained in safety procedures) may additionally interact with the pilot flying in a "virtual co-pilot" capacity. By providing many if not all of the advantages of an additional pilot in the aircraft cockpit without imposing additional weight or space requirements on the aircraft, the system/process of the instant invention can improve flight safety.

BACKGROUND INFORMATION

According to recent reports from the United States Department of Transportation, the NTSB, the FAA, and aviation industry groups, the leading causes of both commercial and private aircraft accidents include: Pilot decision making errors, loss of control, weather encounters, and controlled flight into terrain. The largest number of accidents occur during the departure and landing phases of a flight. These accidents and incidents occur both with multi-pilot crews, and far more frequently with single pilot aircraft operations.

Pilot error can be roughly classified into two forms. The first form is a failure of the pilot or flight crew to perform an act that is appropriate and necessary based on the aircraft's condition or status. This error usually occurs when the crew lacks critical information or fails to recognize the signs and symptoms of a developing hazard that are present in the flight data available to them. The second form of pilot error is the commission of an act that is inappropriate for a given situation. In this latter case, the pilot usually believes that the action is proper, but this belief is based either on inexperience or a lack of accurate information.

A third cause of accidents, particularly with less experienced single pilot operations could be considered "pilot overload" rather than "pilot error." These situations occur when the pilot in command becomes saturated with tasks, information, and things requiring attention to the point of cognitive overload. This can result in the omission of necessary actions, complete inaction, or inappropriate action. These situations typically occur during critical phases of flight, such as takeoff, landing, or during a weather encounter, and often do not resolve themselves successfully.

The occurrence of any of these situations by the flight crew can create a chain of events that, if not broken, results in an accident. One effort previously implemented to reduce aircraft accidents, or at least to a better understanding of the factors contributing to their cause, is the use of a Digital Flight Data Recorder (DFDR). Crash-resistant DFDRs are now installed in most commercial aircraft. However, the data they record is rarely accessed until after a crash has occurred. Thus, the collection and recording of in-flight data, while a boon to determining the cause of a crash, has not led to a marked decrease in aircraft accidents.

A better solution to this problem may be to provide additional personnel to monitor the information normally stored in the DFDR as it becomes available, and to assist the primary pilot in the evaluation of information, decision making, performing cross checks, checklists, and task sharing teamwork. In aviation this is referred to as "cockpit resource management," and is an industry-wide promoted means of training and performing to improve safety. Unfortunately, providing additional personnel is costly. Moreover, the presence of additional personnel on board may be limited by space and weight constraints of a particular airframe. For example, there are growing numbers of small high performance aircraft specifically designed to be operated by a single pilot. The accident record for single-pilot operations is significantly higher than for two-pilot operations, resulting in delays in flight-worthiness certification of single-pilot aircraft and increased insurance costs, which limit the use of these types of airplanes in commercial settings.

Over the past thirty years, numerous systems have been proposed or developed to improve flight safety. One such system is the Remote Aircraft Flight Recorder and Advisory Telemetry (or RAFT) System. This system, described in U.S. Pat. No. 5,890,079, contemplates the use of real-time radio transmission of aircraft data to a central ground station, where the data may be monitored and safely recorded at a remote location. This information then could be analyzed in conjunction with archived data, flight control data, weather data, topological data, global positioning data and manufacturers' data to allow identification of maintenance problems, on-ground safety advisories and in-flight safety advisories. This system, however, does not provide for a trained pilot to monitor and analyze the transmitted information in real-time and supply recommendations to the flight crew, thereby acting as a appropriately trained individual (including but not limited to a appropriately trained individual (including but not limited to a safety pilot or other person trained in safety procedures) or other person trained in safety procedures) or "virtual co-pilot."

Other aircraft-related systems also contemplate real-time radio transmission of aircraft data to a central ground station. For example, U.S. Pat. No. 5,904,724 describes a method and apparatus for the piloting of an aircraft by a remotely-located pilot using a three-dimensional flight simulator. In this system, data on the aircraft's location, attitude and other operating conditions are transmitted to a remote pilot station, wherein they are combined with pre-stored information concerning terrain, manmade structures, etc. to generate a three-dimensional simulation of the environment surrounding the plane. The remotely-located pilot reacts to this view and interacts with the flight controls to pilot the aircraft. This system does not contemplate the use of a remotely located pilot to assist or augment the pilot or flight crew who are on board the plane being controlled, nor does this system propose remote piloting for commercial or private aviation applications.

A third system for improving aircraft operational safety, described in U.S. Pat. No. 6,641,087, also contemplates the transmission of flight-critical data from an aircraft in flight to a remote ground station. This system is designed primarily to allow remote override of flight controls and activation of the plane's autopiloting system to achieve a safe landing in the event of a hijacking. In this system, an onboard computer "manager" takes control of aircraft flight systems, deactivates on-board control of the autopilot system, and instructs the autopilot to fly the aircraft to a safe landing once an override input, such as activation of a panic button or receipt of a predetermined override signal from a remote guidance facility, is received. The manager transmits flight condition data to the remote guidance facility where humans or computers determine optimal flight path and landing instructions for the aircraft. These instructions then are relayed back to the manager, which then forwards the information to the autopilot. Like the RAFT system described above, the anti-hijacking system of U.S. Pat. No. 6,641,087 does not provide for a trained pilot to routinely monitor and analyze the transmitted flight data in real-time and supply recommendations to the pilot, and functionally interact with the pilot in a "CRM" role, thereby acting as a appropriately trained individual (including but not limited to a appropriately trained individual (including but not limited to a safety pilot or other person trained in safety procedures) or other person trained in safety procedures).

In contrast to these previous systems, the instant invention contemplates the use of a appropriately trained individual (including but not limited to a appropriately trained individual (including but not limited to a safety pilot or other person trained in safety procedures) or other person trained in safety procedures) at a remote ground workstation to monitor, via satellite communications or any other real-time, two-way data and voice and/or text communication link, primary flight data and voice and/or text communications from an aircraft in flight. This information may be combined with air traffic data, weather, airport and runway conditions, terrain features, aircraft operating parameters, checklists, etc. to create a simulated instrument panel or even a virtual cockpit or airspace environment. The appropriately trained individual (including but not limited to a appropriately trained individual (including but not limited to a safety pilot or other person trained in safety procedures) or other person trained in safety procedures) then may use the available information to assist the pilot in command of the aircraft with those tasks necessary for the safe, efficient and convenient operation of the aircraft.

SUMMARY OF THE INVENTION

The present invention relates to a system and a process for providing improved operational safety for aircraft. The system/process of the instant invention utilizes real-time, two-way transmission of voice, text messaging, and flight-critical data between an aircraft and a ground-based computer workstation, where it is monitored and acted upon as necessary by a appropriately trained individual (including but not limited to a appropriately trained individual (including but not limited to a safety pilot or other person trained in safety procedures) or other person trained in safety procedures). This appropriately trained individual (including but not limited to a appropriately trained individual (including but not limited to a safety pilot or other person trained in safety procedures) or other person trained in safety procedures) can perform a number of functions that would enhance flight safety, such as flight planning, reducing the workload of the primary pilot(s) during crucial phases of the flight, assisting in the performance of routine checklist tasks, monitoring communications with air traffic control, advising the pilot in the aircraft on how to avoid potential collisions or handle any other emergencies that may arise, or pre-screening general advisories transmitted by air-traffic control, weather services, or other sources to ensure that they are relevant to the particular aircraft with which the appropriately trained individual (including but not limited to a appropriately trained individual (including but not limited to a safety pilot or other person trained in safety procedures) or other person trained in safety procedures) is in communication. By providing many if not all of the advantages of a second or third pilot in the aircraft cockpit and bringing into play additional information from outside the airplane, without imposing additional weight or space requirements on the aircraft, the system/process of the instant invention can maximize flight safety while minimizing associated costs.

DETAILED DESCRIPTION OF THE INVENTION

Figure 1:
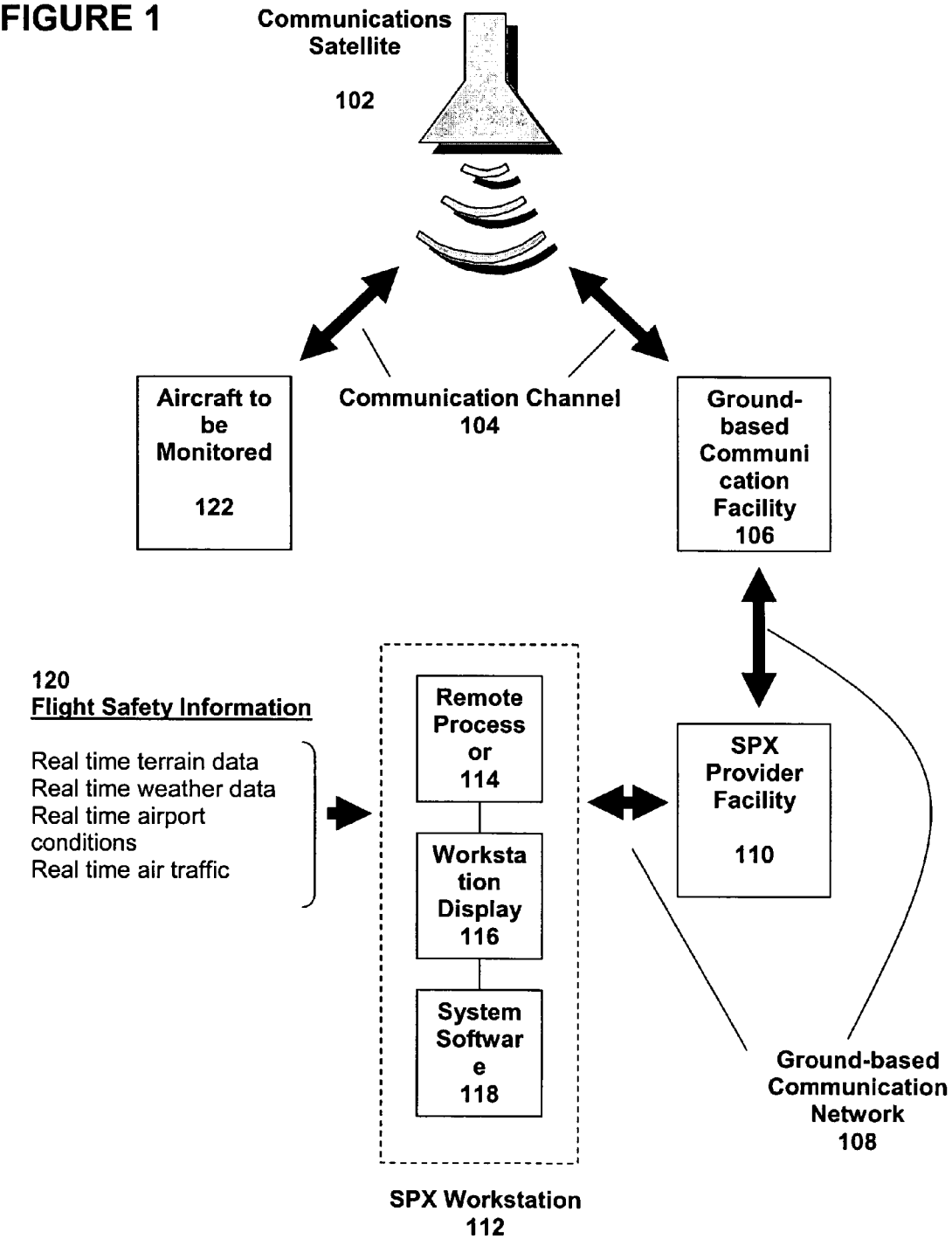
FIG. 1: Schematic representation of the Appropriately trained individual (including but not limited to a safety pilot or other person trained in safety procedures) system.

FIG. 1 shows a appropriately trained individual (including but not limited to a safety pilot or other person trained in safety procedures) System (SPX) that utilizes a unique combination of existing technologies to provide, in a practical manner, all the benefits of a second pilot, and/or a third pilot monitor, without the need for a pilot to be physically present in the aircraft. This system/process is designed to provide critical flight path monitoring, experienced advice, pilot interaction, flight planning, and additional safety information during the crucial phases of flight (e.g., take-off and landing). These functions can be accomplished by tapping into the shared data stream of an integrated avionics suite 202 in the aircraft 122, and communicating to a ground-based computer workstation (SPX workstation) 112 specific flight-critical data 208 and voice and/or text 214 over a communication channel 104 utilizing a communications satellite 102, a ground-based communication facility 106, and a ground-based communication network 108. The information then may be displayed on the SPX workstation display 116, where a trained and experienced appropriately trained individual (including but not limited to a safety pilot or other person trained in safety procedures) (an "SP") or "virtual co-pilot" 302 would monitor the aircraft's data 208, such as speed, position, attitude, configuration, altitude, and rates of change, etc., and have flight safety information 120 available such as air traffic, weather, freezing levels, runway conditions, or other information that may effect the safety and efficiency of the flight.

The SP 302 would be in two-way voice and/or text communication 214 with the flight crew via the aircraft's intercom, and have the ability to send text messages 216 to the flight crew. The SP 302 also would be able to hear and monitor aircraft radio transmission and reception 212, such as instructions and communications from air traffic control as if the SP 302 was in the airplane. Any undesired trends, missed communications, or constructive coaching would be noted and communicated to the pilot in command (PIC) before the situation became a safety issue. The PIC and the SP would have a constructive, goal-oriented interface until the safe conclusion of the flight, or, if preferred, until reaching a stable cruise altitude. At the point where the flight is in cruise or has landed, the SP would disengage with the aircraft being monitored 112 and connect with the next aircraft about to enter a critical phase of flight. If the PIC at any time required assistance, advice, or information, the SP 302 could be contacted to provide the necessary help or services.

As a result of the SPX system/process, a single pilot's workload is greatly reduced, critical flight phases are monitored by a second pilot, and a wealth of additional reference data is brought into the loop for takeoff and landing phases. The SP 302 performs like a coach-instructor, prepping, reviewing and offering guidance in a peer-to-peer, team approach to the flight. The SP 302, armed with the flight safety information 120 available, such as weather, traffic, freezing levels, frequencies, and navigation monitoring contribute to an even higher level of safety than can be achieved with a second pilot physically present in the cockpit. Application of the SPX program to multiple crew operations also will increase the safety margin and instill a professional and task-oriented demeanor during critical flight phases.

The SPX system/process will be especially useful in its applications to the operation of the new very light jets ("VLJs"\) (e.g., Eclipse, Mustang, Adam A700, Avocet, etc.) in personal and air-taxi operations, where safety, financial and payload issues will become more pronounced. Without an SPX-like system/process, single pilot operations may not be affordably insurable, and will be statistically less safe overall. Adding a second pilot adds weight, reduces cabin volume, adds substantial overhead, and removes revenue seats. An SPX system/process frees weight and space, contributes more expertise and flight critical information, and eliminates the expense of the second pilot. The pilot services also may be provided when needed most, for example during the critical phases of take-off, departure, and approach.

Additional services such as pre-flight planning, route selection, passenger services (arrangement of ground transportation, lodging, etc.), weather briefings, and the like could be offered to the pilot through the SPX service in order to bring all the benefits of quality assurance/quality control (QA/QC) to the flight, even in the case of a single pilot. Customer services can be provided to the passengers through the same voice and/or text link during the flight, eliminating the distractions to the pilot, and adding to the convenience and comfort of the passengers.

Figure 2:
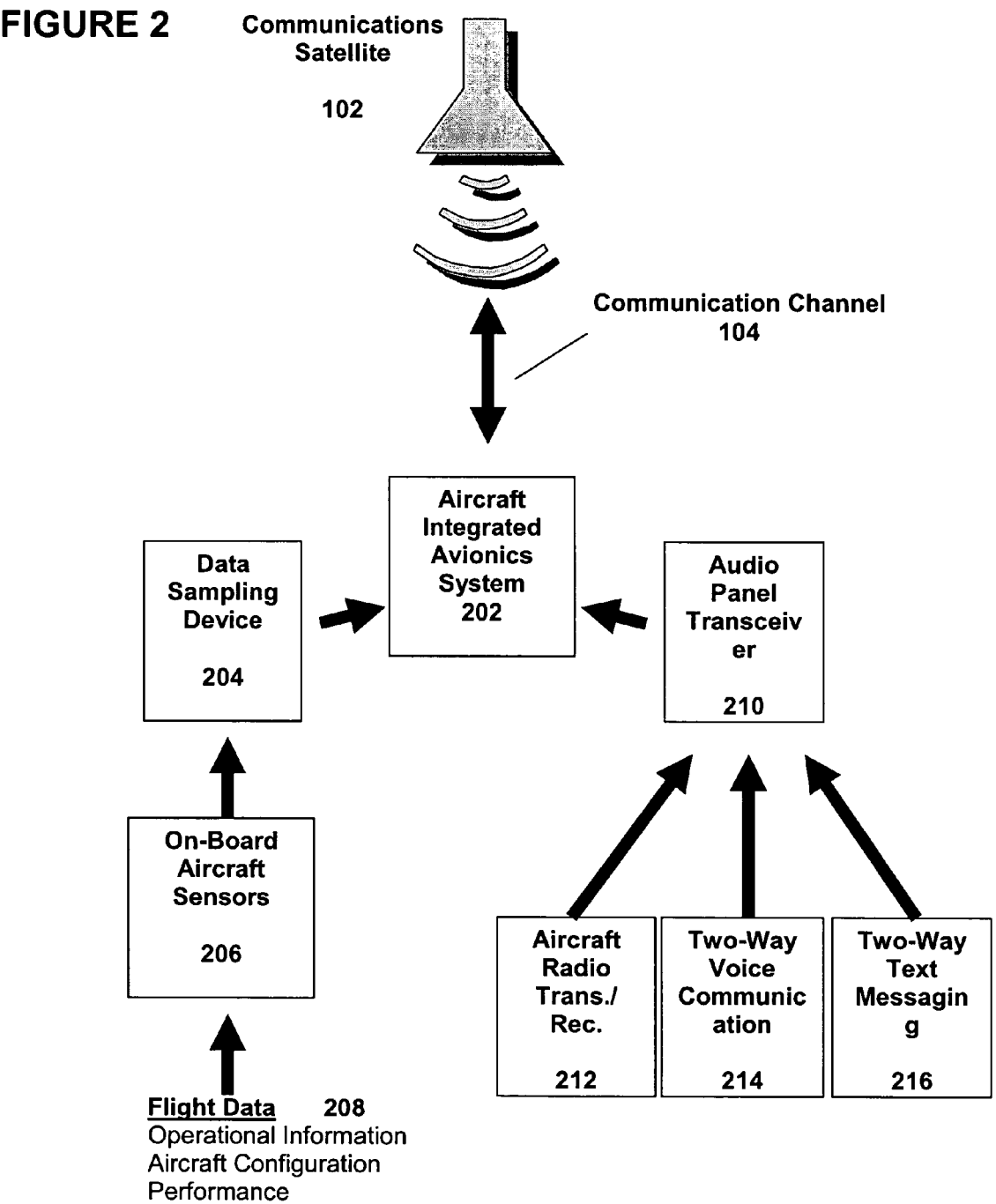
FIG. 2: Schematic representation of the Aircraft Integrated Avionics System.
Figure 3:
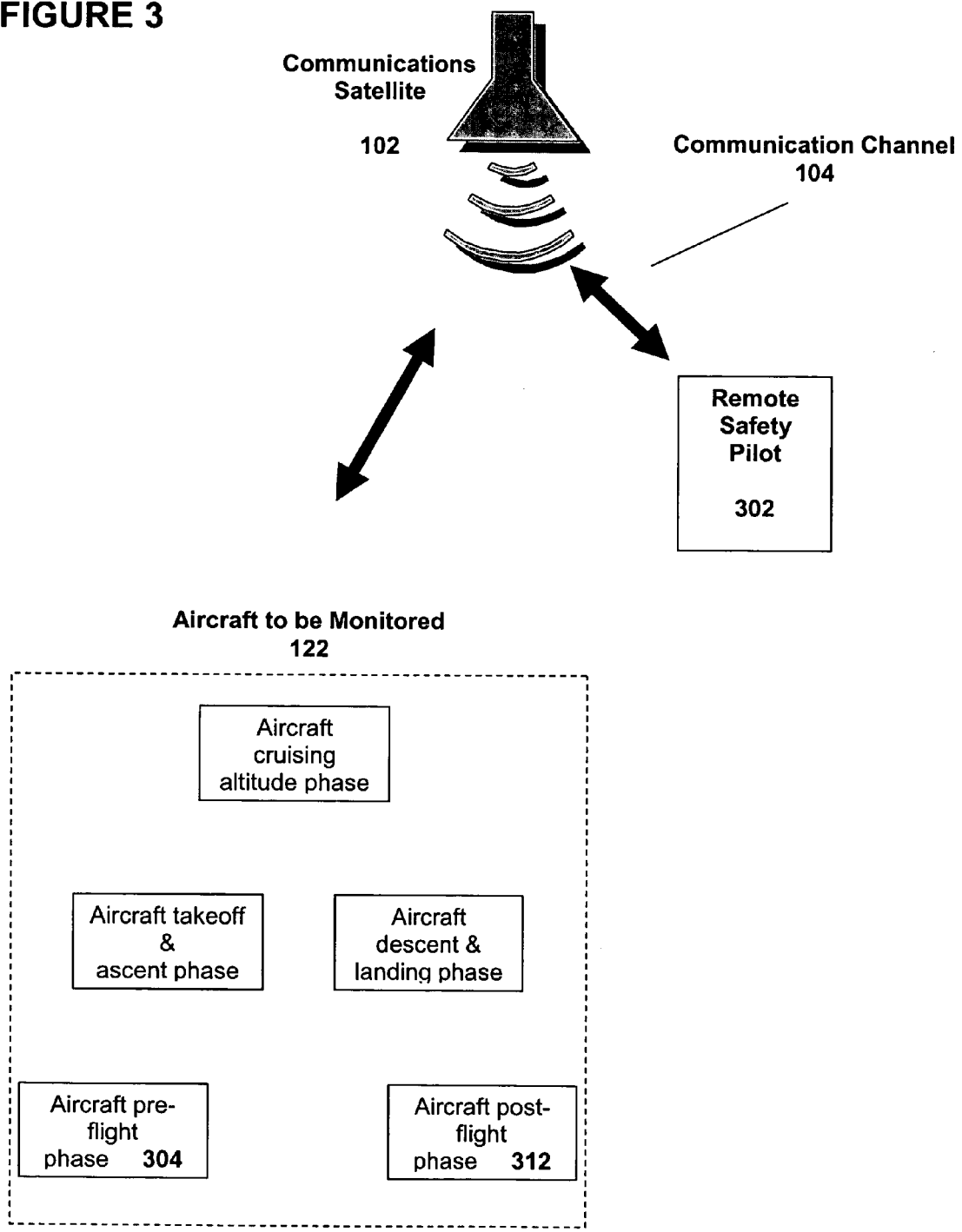
FIG. 3: Schematic representation of the Appropriately trained individual (including but not limited to a safety pilot or other person trained in safety procedures) process.

In a preferred embodiment, the SPX system/process would function as shown in FIGS. 1, 2, and 3. In FIG. 2, the aircraft to be monitored 122 by the SPX system/process is equipped with one or more of the following devices: 1) an integrated avionics and data bus such as ARINC 429 or other integrated avionics systems 202 known to those of ordinary skill in the art; 2) a data-sampling device 204 that transmits specific flight-data 208 from select avionics and on-board aircraft sensors 206; and 3) an audio panel transceiver 210, which allows the SP 302 to hear all aircraft radio reception and transmission 212, permits two-way intercom communications 214 and text messaging 216 between the PIC and the SP 302. In addition, the aircraft to be monitored 122 should have Satellite Communication (SATCOM) simultaneous voice and/or text and data transmit/receive capability.

The aircraft data 208 and the two-way voice and/or text communications 214 from the aircraft to be monitored 122 are transmitted in real time to the SPX workstation 112 via a communications satellite 102, a communication channel 104, a ground-based communication facility 106, and a ground-based communication network 108. One non-limiting example of a suitable satellite communication network is the Iridium low earth orbit satellite network. These communication channels have the advantages of worldwide coverage, high speed, and high reliability. If desired, these communications systems also have the capacity to carry transmissions that are encrypted so that they are resistant to unauthorized eavesdropping or tampering (e.g., hacking). The information is then relayed via high-speed ground-based communications to the SPX service provider facilities 110.

At an SPX service provider facility 110, the voice and/or text and data stream is routed to one or more SPX support personnel 302 for display on the SPX workstation display 116, and transmission of voice and/or text 214, aircraft radio reception and transmission 212, and flight data 208 via the SPX workstation 112. The SPX workstation 112 receives flight data 208, such as aircraft flight, position, and configuration data, as well as two-way voice and/or text communication 214 and text messaging 216 with the pilot. The SPX workstation display 116 replicates airborne displays for flight monitoring, along with flight safety information 120 such as collision avoidance data, weather, airport and runway conditions, terrain, winds, aircraft operating parameters, checklists and other data. The SP 302 functions and interacts with the PIC in a co-pilot and appropriately trained individual (including but not limited to a safety pilot or other person trained in safety procedures) capacity.

The SPX workstation 112 contains a remote processor 114 that runs system software 118 that permits aircraft configuration, performance, location, and flight data 208 to be displayed on the SPX workstation display 116, or in a simulated instrument panel. The SP then may interact with the simulated instrument panel and/or voice and/or text transmissions to monitor the aircraft's primary flight data 208 such as altitude, airspeed, heading, attitude, landing gear position, flap position and other such data.

In an alternative embodiment, aircraft flight data 208 also could be displayed in a virtual environment that depicts the aircraft in relation to nearby terrain, other air or ground traffic, and which takes into account prevailing weather or visibility conditions. This type of virtual simulator would provide the SP with additional information and enhanced situational awareness, which may be used to advise the PIC of any deviations from the preferred flight path, or to advise the PIC of any potential conflicts.

Aircraft-and operator-specific checklists, performance data, and operational parameters also may be presented to the SP on demand. During certain phases of flight, the SP assists the PIC with the completion of checklist tasks and preparation for the next phase of flight. Certain other tasks, such as landing gear extension, can be confirmed with the PIC verbally as well as confirmed via a specific data feed from the aircraft 122.

If the aircraft to be monitored 122 is single-pilot certified, the SP shares the workload with the PIC, and also may monitor the activities of the PIC in much the same way as would an onboard co-pilot, but having the advantage of the additional information resources available through the SPX workstation. If the aircraft 122 is certified for a crew of two or more, the SP serves as an additional pilot, with a primary mission of ensuring flight safety, who provides flight planning, routing, and situational awareness functions in addition to those provided by the on-board crew.

The SPX workstation also would provide utilities to aid the PIC in flight planning, both before the flight and during the flight. For example, the SP could perform all the flight planning and flight plan filing duties for the pilot, and then verify the clearance with the pilot during the pre-start phase of the flight. If changing weather, fuel, or traffic conditions affect the planned route, the SP could provide alternate routes or landing planning while the flight is en route. This workload-sharing type of service allows the PIC to concentrate on direct flying duties rather than potentially distracting ("heads-down") administrative duties.

Two-way intercom voice and/or text communication 214 allows for a free flow of verbal information between the PIC and the SP 302, as well as allowing the SP 302 to monitor air radio reception 212, such as Air Traffic Control communication, and confirm the instructions with the pilot either through two-way communication 214 or text messaging 216. These activities again mirror established pilot monitoring activities for operations with a co-pilot on-board.

Text messaging 216 from the SP 302 to the PIC, using simple data transmission and a text display device integrated into the aircraft avionics system 202, allows communication with the PIC during times of saturated aircraft radio reception 212 from the air traffic control radio transmission. The PIC would be able to confirm the receipt of such messages by an electronic signal, confirmation button, or voice and/or text command as part of the aircraft avionics system 202.

The SPX process is shown in FIG. 3. During the pre-flight phase 304, the PIC initiates contact with the SPX system/process, and may request, among other services, assistance with flight planning, calculation of fuel load, information regarding weather conditions, and performance of pre-flight checklist tasks.

From pre-flight 304 through cruise 308, the SP 302 is connected, via satellite communications or any other real-time, data 208 and two-way voice and/or text communication link 214, with the aircraft 122, so that aircraft data 208, including performance data, configuration data, location, and primary flight data may be continuously transmitted to the SPX workstation 112, along with full duplex voice and/or text communication 214.

At the SPX workstation 112, the SP 302 monitors primary flight data 208, voice and/or text aircraft radio communications 212, and aircraft configuration in much the same way a co-pilot would if on-board the aircraft. The SP 302 also may review the flight plan and participate in the performance of checklist tasks. The SP 302 can coordinate flight data 208 received from the aircraft 122 with flight safety information 120, such as weather, Air Traffic Control, advisories from the aircraft manufacturer, and other available information.

SPX-provided services may be obtained by the PIC during critical phases of flight or during other phases of the flight as needed or desired. For example, monitoring by the SP may occur during departure and climb 306 to cruising altitude, with the SP monitoring aircraft configuration, air traffic, and weather conditions, and assisting the PIC with performance of the climb and cruise checklist tasks. At cruise altitude 308, the PIC may request assistance from the SP regarding en route weather conditions, alternate landing options, etc. At some predetermined point prior to the initial descent 310, the PIC may re-establish communications and a data link with the SPX system/process. The SP 302 then may provide descent and approach monitoring, assist in the performance of landing checklist tasks, and/or advise the PIC regarding runway, air traffic and weather conditions. After landing, the SP 302 may assist in the performance of post-flight 312 checklist tasks, may arrange ground transportation or lodging services, or may facilitate the planning and execution of the next leg of the flight.

A variety of technologies presently exist that may be employed to perform the various component functions that comprise the SPX system/process. For example, integrated aircraft avionics systems 202 using a shared data bus that could be employed in the SPX system/process include, but are not limited to, the Garmin G 1000 and ARINC 429 avionics packages. Reliable, real-time, two-way communications systems 214 to be employed could include, but are not limited to, satellite communications systems such as the Iridium system. Computer workstation flight analysis hardware 112 and software 118 devices could include the Sim-Author workstation system. In addition to these specific examples, the artisan of ordinary skill would recognize that these components could be readily replaced by a variety of equivalents to perform the functions described herein for the SPX system/process. Moreover, the instant invention contemplates that additional technologies and standards will be developed that will improve and enhance the communication and interaction between the PIC and the SP; such technologies and standards also may be incorporated into the SPX system/process. For example, certain technological enhancements may enable the SP 302 to perform additional functions in the airplane, such as changing radio frequencies, programming a flight management system, or even potentially controlling the aircraft in the event of pilot incapacitation.

Non-limiting examples of aircraft operations to which the SPX system/process may be applied include, but are not limited to, air charter operations, part 91 corporate operations, owner-operated aircraft, night freight services, and fractional aircraft operations. The SPX system/process also may be implemented in situations where modern avionics systems are being retrofitted onto older aircraft.

The various references cited herein are incorporated by reference in their entireties.

The provision herein of certain preferred embodiments and teaching examples is without prejudice to the applicant's right to practice and claim the full scope of the present invention as embodied in other or alternate embodiments, and the examples of the specification will be understood by those of ordinary skill in the art as not limiting the spirit and scope of the invention as set forth in the below claims.

What is claimed is:

1. A system for providing improved operational safety of a piloted aircraft comprising:
    a plurality of on-board aircraft sensors and avionics for providing real-time data relevant to the operational safety of the aircraft;
    a communication channel for establishing real-time voice or text communications with the aircraft;
    a remote processor for processing the real-time data relevant to the operational safety of the aircraft to provide a real-time flight analysis; and
    a ground based computer workstation for providing the real-time flight analysis and voice or text communications to a remote safety person functioning in a co-pilot capacity for monitoring the operational safety of the aircraft and providing information designed to improve flight safety.

2. The system of claim 1, further comprising a plurality of real-time data sources other than from the aircraft itself relevant to the operational safety of the aircraft.

3. The system of claim 2, wherein said plurality of real-time data sources other than from the aircraft itself may include at least two of air traffic, weather, freezing levels, and runway conditions.

4. The system of claim 2, wherein said real-time data sources comprises an air traffic control broadcast.

5. The system of claim 1, wherein said real-time data relevant to the operational safety of the aircraft comprises aircraft speed, aircraft position, aircraft attitude, aircraft configuration, aircraft altitude, aircraft rates of change, landing gear position, and flap position.

6. The system of claim 1, further comprising a ground-based communication network for relaying said real-time data and voice and/or text communications from the aircraft to the ground based computer workstation.

7. The system of claim 6, wherein said ground-based communication network comprises a ground-based communication facility, a provider workstation provider facility, and the ground-based computer workstation.

8. The system of claim 1, wherein said ground-based computer workstation comprises a workstation display for displaying information to the remote safety person functioning in a co-pilot capacity.

9. The system of claim 8, wherein the information displayed on the workstation display comprises a replication of airborne displays for flight monitoring and safety information.

10. The system of claim 9, wherein the information displayed on the workstation display comprises aircraft configuration, performance, location, and flight data.

11. The system of claim 10, wherein the information displayed on the workstation display comprises safety information, collision avoidance data, weather, airport and runway conditions, terrain, winds, aircraft operating parameters, and checklists.

12. The system of claim 9, wherein the information displayed on the workstation display comprises at least one of aircraft configuration, performance, location, flight data, safety information, collision avoidance data, weather, airport and runway conditions, terrain, winds, aircraft operating parameters, and checklists.

13. The system of claim 8, wherein the workstation display comprises a simulated instrument panel.

14. The system of claim 13, wherein the simulated instrument panel comprises a virtual simulator.

15. The system of claim 14, wherein the information displayed on the virtual simulator comprises information relating to nearby terrain, air or ground traffic, prevailing weather and visibility conditions.

16. The system of claim 1, further comprising system software on the ground-based computer workstation for displaying aircraft configuration, performance, location, and flight data on the workstation display.

17. The system of claim 1, wherein said communication channel comprises two-way communication between a flight crew and the remote safety person functioning in a co-pilot capacity.

18. The system of claim 1, further comprising a data sampling device for transmitting the on-board aircraft sensor data and avionics to the ground-based computer workstation over the communication channel.

19. The system of claim 1, further comprising an audio panel transceiver so that both the remote safety person functioning in a co-pilot capacity and a real pilot can hear at least some aircraft radio transmissions broadcast over the communication channel.

20. The system of claim 1, wherein said real-time flight analysis and voice and/or text communications transmitted to the remote safety person functioning in a co-pilot capacity for monitoring comprises encrypted communications.

21. The system of claim 1, wherein said communication channel comprises a satellite link.

22. The system of claim 21, wherein the satellite link comprises an orbiting communications satellite based communication network.

23. The system of claim 1, further comprising an aircraft cockpit display for displaying text messages transmitted from the ground-based computer workstation by the remote safety person functioning in a co-pilot capacity.

24. The system of claim 23, wherein the data displayed on the aircraft cockpit display comprises text messages of information and/or instructions from the remote safety person functioning in a co-pilot capacity.

25. The system of claim 1, wherein said real-time data relevant to the operational safety of the aircraft comprises at least one of aircraft speed, aircraft position, aircraft attitude, aircraft configuration, aircraft altitude, aircraft rates of change, landing gear position, and flap position.

26. A process for providing improved operational safety of a piloted aircraft comprising:
  accessing in real-time data relevant to the operational safety of the aircraft from on-board aircraft sensors and avionics;
  establishing real-time voice and/or text communications with the aircraft over a communication channel;
  processing said real-time data relevant to the operational safety of the aircraft on a remote processor to provide a real-time flight analysis;
  providing said real-time flight analysis and voice and/or text communications to a remote safety person functioning in a co-pilot capacity for monitoring the operational safety of the aircraft on a ground-based computer workstation; and
  transmitting information and/or instructions to the aircraft for improving the operational safety of the aircraft based on the flight analysis and/or voice and/or text communications.

27. The process of claim 26, further comprising accessing in real-time data relevant to the operational safety of the aircraft from sources other than the aircraft itself.

28. The process of claim 27, wherein accessing the real-time data from sources other than the aircraft itself comprises receiving information such as air traffic, weather, freezing levels, and runway conditions.

29. The process of claim 27, wherein accessing the real-time data comprises receiving an air traffic control broadcast.

30. The process of claim 27, wherein accessing the real-time data from sources other than the aircraft itself comprises receiving information including at least one of air traffic, weather, freezing levels, and runway conditions.

31. The process of claim 26, wherein accessing the real-time data relevant to the operational safety of the aircraft comprises receiving aircraft speed, aircraft position, aircraft attitude, aircraft configuration, aircraft altitude, aircraft rates of change, landing gear position, and flap position.

32. The process of claim 26, further comprising relaying the real-time data and voice and/or text communications from the aircraft to the ground-based computer workstation through a communication network.

33. The process of claim 26, further comprising transmitting a plurality of flight critical data feeds to the ground-based computer workstation.

34. The process of claim 26, further comprising displaying information to the remote safety person functioning in a co-pilot capacity on a computer workstation display.

35. The process of claim 34, wherein displaying information on the workstation display comprises replicating airborne displays for flight monitoring and safety information.

36. The process of claim 35, wherein displaying information on the workstation display comprises displaying aircraft configuration, performance, location, and flight data.

37. The process of claim 36, wherein displaying information on the workstation display comprises displaying safety information, collision avoidance data, weather, airport and runway conditions, terrain, winds, aircraft operating parameters, and checklists.

38. The process of claim 36, wherein displaying information on the workstation display comprises displaying at least one of safety information, collision avoidance data, weather, airport and runway conditions, terrain, winds, aircraft operating parameters, and checklists.

39. The process of claim 35, wherein displaying information on the workstation display comprises displaying at least one of aircraft configuration, performance, location, and flight data.

40. The process of claim 34, wherein displaying information on the workstation display comprises displaying information on a simulated instrument panel.

41. The process of claim 40, wherein displaying information on the simulated instrument panel comprises displaying information on a virtual simulator.

42. The process of claim 41, wherein displaying information on the virtual simulator comprises displaying nearby terrain, air or ground traffic, prevailing weather and visibility conditions.

43. The process of claim 26, further comprising displaying aircraft configuration, performance, location, and flight data using system software on the ground-based computer workstation.

44. The process of claim 26, wherein communicating between a flight crew and the remote safety person functioning in a co-pilot capacity over the communication channel comprises communicating through two-way transmission.

45. The process of claim 26, further comprising transmitting the data from the on-board aircraft sensors and avionics through a data sampling device.

46. The process of claim 26, wherein providing the real-time flight analysis and voice and/or text communications to the remote safety person functioning in a co-pilot capacity for monitoring comprises receiving all radio aircraft transmissions using an audio panel transceiver.

47. The process of claim 26, wherein providing the real-time flight analysis and voice and/or text communications to the remote safety person functioning in a co-pilot capacity for monitoring comprises transmitting encrypted communications.

48. The process of claim 26, wherein transmitting information and/or instructions to the aircraft comprises transmitting pre-flight, flight, and post-flight information and/or instructions.

49. The process of claim 48, wherein transmitting the pre-flight information and/or instructions comprises transmitting flight planning, calculation of fuel load, information regarding weather conditions, and performance of pre-flight checklist tasks.

50. The process of claim 48, wherein transmitting the flight information and/or instructions comprises transmitting alternate routes and/or landing planning.

51. The process of claim 48, wherein transmitting the pre-flight information and/or instructions comprises transmitting at least one of flight planning, calculation of fuel load, information regarding weather conditions, and performance of pre-flight checklist tasks.

52. The process of claim 26, further comprising transmitting a text message transmission from the ground-based computer workstation by the remote safety person functioning in a co-pilot capacity to an aircraft cockpit display.

53. The process of claim 26, wherein accessing the real-time data relevant to the operational safety of the aircraft comprises at least one of receiving aircraft speed, aircraft position, aircraft attitude, aircraft configuration, aircraft altitude, aircraft rates of change, landing gear position, and flap position.

54. The process of claim 26, further comprising displaying at least one of aircraft configuration, performance, location, and flight data using system software on the ground-based computer workstation.

55. The process of claim 26, wherein transmitting information and/or instructions to the aircraft comprises transmitting at least one of pre-flight, flight, and post-flight information and/or instructions.

* * * * *